US007287181B2

(12) United States Patent
Thompson

(10) Patent No.: US 7,287,181 B2
(45) Date of Patent: Oct. 23, 2007

(54) MIRRORED VOLUME REPLICATION METHOD, APPARATUS, AND SYSTEM

(75) Inventor: John Glenn Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/811,664

(22) Filed: Mar. 29, 2004

(65) Prior Publication Data

US 2004/0205391 A1 Oct. 14, 2004

(51) Int. Cl.
*G06F 11/00* (2006.01)

(52) U.S. Cl. .............................................. 714/6; 714/7

(58) Field of Classification Search .................... 714/5, 714/6, 7

See application file for complete search history.

(56) References Cited

U.S. PATENT DOCUMENTS 5,592,618 A 1/1997 Micka et al. .......... 395/185.07
5,734,818 A 3/1998 Kern et al. ............ 395/182.18
5,870,537 A 2/1999 Kern et al. ............ 395/182.04
6,052,797 A 4/2000 Ofek et al. .................... 714/6
6,321,295 B1 11/2001 Vincent ...................... 711/117
6,557,089 B1 * 4/2003 Reed et al. ................. 711/162
6,643,671 B2 11/2003 Milillo et al. ............... 707/204
2005/0015656 A1 * 1/2005 Hetzler et al. ................. 714/6
2005/0081091 A1 * 4/2005 Bartfai et al. .................. 714/6

* cited by examiner

*Primary Examiner*—Scott Baderman
*Assistant Examiner*—Tim Bonura
(74) *Attorney, Agent, or Firm*—Kunzler & McKenzie

(57) ABSTRACT

A secondary volume of a mirrored volume pair is replicated by suspending the mirroring operations, associating a selected volume identifier with the secondary volume, replicating the secondary volume to a backup volume, and associating the original secondary volume identifier with the backup volume. In some embodiments the original secondary volume identifier is written to a hidden field on the secondary volume and the hidden field is copied to the backup volume identifier field after the replication. In some embodiments the actions of suspending the mirror operations, managing the volume identifiers, replicating the secondary volume to a backup volume, synchronizing the secondary volume with the primary volume, and reestablishing the mirror pair are performed as an automated sequence. The resultant replication method is less costly and error prone because it may be created by an automated process rather than manual commands issued by a system administrator.

26 Claims, 4 Drawing Sheets

MIRRORED VOLUME REPLICATION METHOD, APPARATUS, AND SYSTEM

BACKGROUND OF THE INVENTION

1. Field of the Invention

The invention relates to data replication means and methods. More particularly, the invention relates to an apparatus, system and method for replicating a secondary volume of a mirrored volume pair to a backup volume.

2. Description of the Related Art

It is well known that during operation a CPU may update one or more data storage volumes in an attached storage subsystem. It is further known that replication of data storage volumes is a frequently used strategy for maintaining continuously available information systems in the presence of system level faults or failures. Among several replication techniques, mirroring is often favored over point-in-time copying in that a data mirror is continuously updated and may be quickly substituted for an unavailable primary volume.

Data mirroring involves maintaining identical copies of data on a primary volume and a secondary volume. Volume-to-volume mirroring from a primary volume to a secondary volume may be accomplished either synchronously (in real time) or asynchronously (at selected occasions or intervals). In either case, the primary volume is typically available for use by a host processor and the secondary volume is offline.

Referring to FIG. 1, a prior art peer-to-peer remote copy (PPRC) system 100 is illustrated. The PPRC system 100 is one example of a synchronously mirrored system and includes a primary storage system 110 and a secondary storage system 120. A host 130 is connected to the primary storage system 110. The host 130 stores data by sending write requests to the primary storage system 110.

Data written to primary storage system 110 is copied to the secondary storage system 120, creating a mirror image of the data residing on the primary storage system 110 on the secondary storage system 120. In the PPRC system 100, a write made by the host 130 is considered complete only after the data written to the primary storage system 110 is also written to the secondary storage system 120. The primary host 130 may take various forms, such as a server on a network, a Web server on the Internet, or a mainframe computer. In the depicted examples, the primary storage system 110 and secondary storage system 120 are disk systems.

A communication path 140 connects the host 130 to the primary storage system 110. A communication path 150 connects the primary storage system 110 with the secondary storage system 120. The communication paths 140/150 may comprise various links, such as fiber optic lines, packet switched communication links, enterprise systems connection (ESCON) fibers, small computer system interface (SCSI) cable, and wireless communication links.

The primary storage system 110 includes at least one storage volume 160 typically referred to as a primary volume and other well-known components such as a controller, cache, and non-volatile storage. The secondary storage system 120 includes at least one storage volume 170, typically referred to as a secondary volume. The primary volume 160 and secondary volume 170 are set up in PPRC pairs. PPRC pairs are synchronous mirror sets in which a storage volume in the primary storage system 110 has a corresponding storage volume in the secondary storage system 120 with data that is identical. This pair is referred to as an established PPRC pair or synchronous mirror set.

In operation, each time a write request is sent to the primary volume 160 by the host 130, the primary storage system 110 stores the data on the primary volume 160 and also sends the data over the communication path 150 to the secondary storage system 120. The secondary storage system 120 then copies the data to the secondary volume 170 to form a mirror of the primary volume 160.

FIG. 2 depicts a prior art asynchronously mirrored data system 200 including a host 210, one or more application programs 220, and a data mover 230. A primary storage system 240 is connected to the host 210 by one or more channels, for example, fiber optic channels. At least one primary volume 250 is contained within or connected to the primary storage system 240.

A secondary storage system 260 is connected to the host 210 by one or more channels or alternatively by a communication link. Contained within or connected to the secondary storage system 260 is at least one secondary volume 270. In some systems, a direct communication link may be established between the primary storage system 240 and the secondary storage system 260. In such systems, the data mover 230 may reside within the primary storage system 240.

The asynchronously mirrored data system 200 collects data from the primary storage systems 240 so that all write requests from the host 210 to the primary volume 250 are preserved and applied to the secondary volume 270 without significantly impacting access rates for the host 210. The data and control information transmitted to the secondary storage system 260 is sufficient such that the presence of the primary storage system 240 is no longer required to preserve data integrity.

The application programs 220 generate write requests, which update data on the primary volume 250. The locations of the data updates are tracked by the primary storage system 240. Often, updates to the primary volume 250 are tracked on a track-by-track basis. A two dimensional array of bits (a bit map), often referred to as an active track array or changed track array, is typically used to keep a real-time record of tracks on the primary volume that have been changed since the last synchronization. The changed track array is maintained in the primary storage system 240. The primary storage system 240 may group the updates and conduct a synchronization session to provide the updates to the data mover 230. The updates are transmitted from the data mover 230 to the secondary storage system 260, which writes the updates to the secondary volume 270.

Asynchronous mirroring has minimal impact on the access rate between the primary host 210 and the primary storage system 240 because a subsequent I/O operation may start directly after receiving acknowledgement that data has been written to the primary volume 250. While write requests may occur as demanded by the application programs 220, synchronization of the secondary volume 270 is an independent, asynchronous event. For example, synchronization sessions may be scheduled periodically throughout the day as directed by settings managed by a system administrator, typically several times per hour. Thus, the asynchronous secondary volume 270 may be only rarely identical to the primary volume 250, since additional writes requests to the primary volume 250 may occur during the copy operation necessary to synchronize the secondary volume.

In some systems, both synchronous and asynchronous data mirror pairs are maintained. This configuration permits rapid promotion of a synchronous mirror system to become a replacement primary storage system in the event that the original primary storage system becomes unavailable. The configuration also provides for the maintenance of a nearly real-time remote copy of the primary storage system data for use if the primary site becomes unavailable. In this configuration, the storage volumes on the primary storage system may act as the primary volumes for both the synchronously mirrored volumes and asynchronously mirrored volumes.

In disk mirroring environments, system administrators may desire to create a point-in-time archive or backup copy. In order to minimize the effect on system performance, it is desirable to use the secondary volume as the data source for the copy while allowing the host to access the primary volume in a normal fashion. However, since the secondary volume is an exact copy of the primary volume, the volume identifier is the same on both the primary volume and the secondary volume. The secondary volume cannot be brought online to perform the copy since doing so would introduce duplicate volume identifiers on the system.

In order to backup a mirrored volume pair, the user may bring the secondary volume online to a different system and perform the backup operation on that system. This method eliminates the problem of duplicate volume identifiers. Nevertheless, since multiple systems are required to perform the backup, the solution typically necessitates the purchase of another system.

Alternately, the user may change the volume identifier of the secondary volume, then bring the secondary volume online to the same system as the primary volume and use the renamed secondary volume as the data source for the copy. A disadvantage of this solution is that the backup or archive volume does not have the original secondary volume identifier. During a restore operation, the user is required to remember the original volume identifier of the secondary volume and manually rename the restored volume with the original volume identifier after the restore operation. This procedure is error-prone and often results in system downtime.

Given the aforementioned alternatives, a need exists for an apparatus, method, and system to replicate a secondary volume of a mirrored volume pair including the volume identifier on a backup storage volume. Beneficially, such an apparatus, method, and system would simplify the creation of a point-in-time backup on a mirrored system and decrease the probability of error in restoring the backup.

SUMMARY OF THE INVENTION

The present invention has been developed in response to the present state of the art, and in particular, in response to the problems and needs in the art that have not yet been fully solved by currently available mirror volume replicaters. Accordingly, the present invention has been developed to provide a method, apparatus, and system for replicating a secondary volume of a mirrored pair that overcomes many or all of the above-discussed shortcomings in the art.

The apparatus for replicating a secondary volume of a mirrored pair is provided with logic containing a plurality of modules configured to functionally execute the necessary steps of replicating the mirror pair secondary volume. These modules in the described embodiments include a mirror module, a volume identification module, and a data replication module.

The apparatus, in one embodiment, includes a mirror module that suspends mirroring operations between a primary volume and a secondary volume and, in some embodiments, also resynchronizes the secondary volume to the primary volume and reestablishes the mirror pair. A data replication module copies the data on the secondary volume to a backup volume.

A volume identification module associates a secondary volume with a selected volume such that the secondary volume may be brought online without introducing duplicate volume identifiers. The volume identification module also associates the suspend-time secondary volume identifier to the backup volume. In some embodiments, the volume identification module copies the suspend-time secondary volume identifier to a hidden field on the secondary volume and associates the contents of the hidden field to the backup volume subsequent to the volume replication.

A system of the present invention is also presented for replicating a secondary volume of a mirrored pair. The system may be embodied with a host, a primary storage system, a secondary storage system functioning to provide a synchronous data mirror, and a backup system. The mirroring operations may be suspended and the secondary volume associated with a selected identifier such that the secondary volume may be brought online without introducing duplicate volume identifiers. The secondary volume may be replicated to a backup volume, and the backup volume associated with the suspend-time secondary volume identifier.

In some embodiments, the suspend-time secondary volume identifier is written to a hidden field on the secondary volume and the contents of the hidden field are associated with the backup volume after the replication to the backup volume is complete. In some embodiments, the operations of suspending mirroring operations, managing the volume identifiers, replicating the secondary volume to a backup volume, and reestablishing mirroring operations between the primary volume and the secondary volume are performed as an automated sequence responsive to a single command from a system administrator.

A method of the present invention is also presented for replicating a secondary volume of a mirrored pair. The method in the disclosed embodiments substantially includes the steps necessary to carry out the functions presented above with respect to the operation of the described apparatus and system. In one embodiment, the method includes suspending mirror operations between a primary volume and a secondary volume, associating the secondary volume with a selected volume identifier, replicating the secondary volume to a backup volume, and associating the suspend-time secondary volume identifier to a backup volume.

In one embodiment, the method also includes writing the suspend-time secondary volume identifier to a hidden field on the secondary volume and associating the contents of the hidden field with the backup after the replication of the secondary volume to the backup volume. In some embodiments, the method further includes resynchronizing the secondary volume to the primary volume and reestablishing mirroring operations between the primary volume and the secondary volume.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
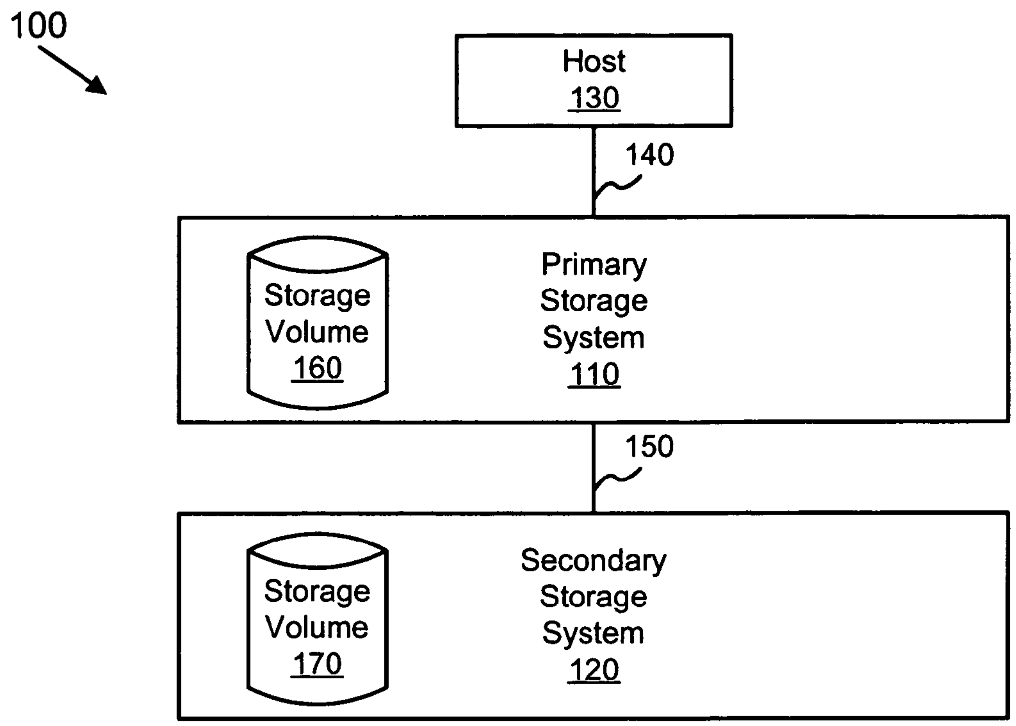
(Prior Art) Fig. 1
FIG. 1 is a schematic block diagram illustrating a prior art peer-to-peer remote copy (PPRC) system.
Figure 2:
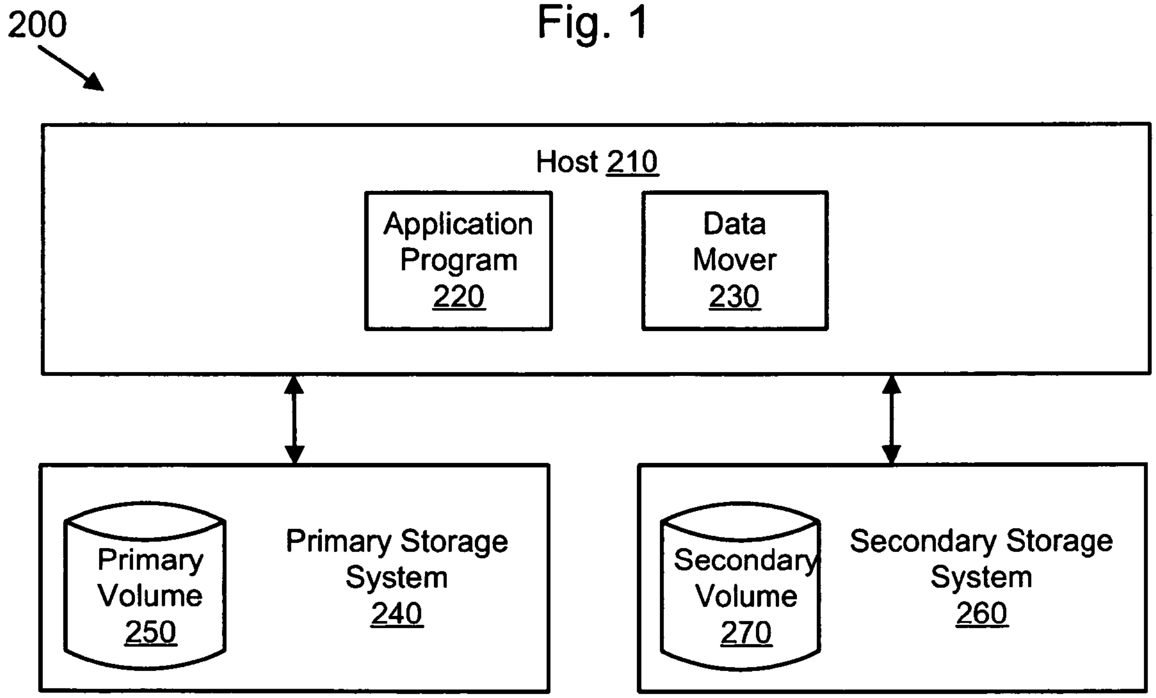
(Prior Art) Fig. 2
FIG. 2 is a schematic block diagram illustrating a prior art asynchronously mirrored data system.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

The present invention sets forth an apparatus, system and method to replicate a secondary volume of a mirrored volume pair. The invention may be embodied in a system with one or more mirror pairs, each mirror pair including a primary storage volume and a secondary storage volume. The mirroring operations may be synchronous or asynchronous. The resultant replicated copy of the secondary volume contains the suspend-time secondary volume identifier.

Figure 3:
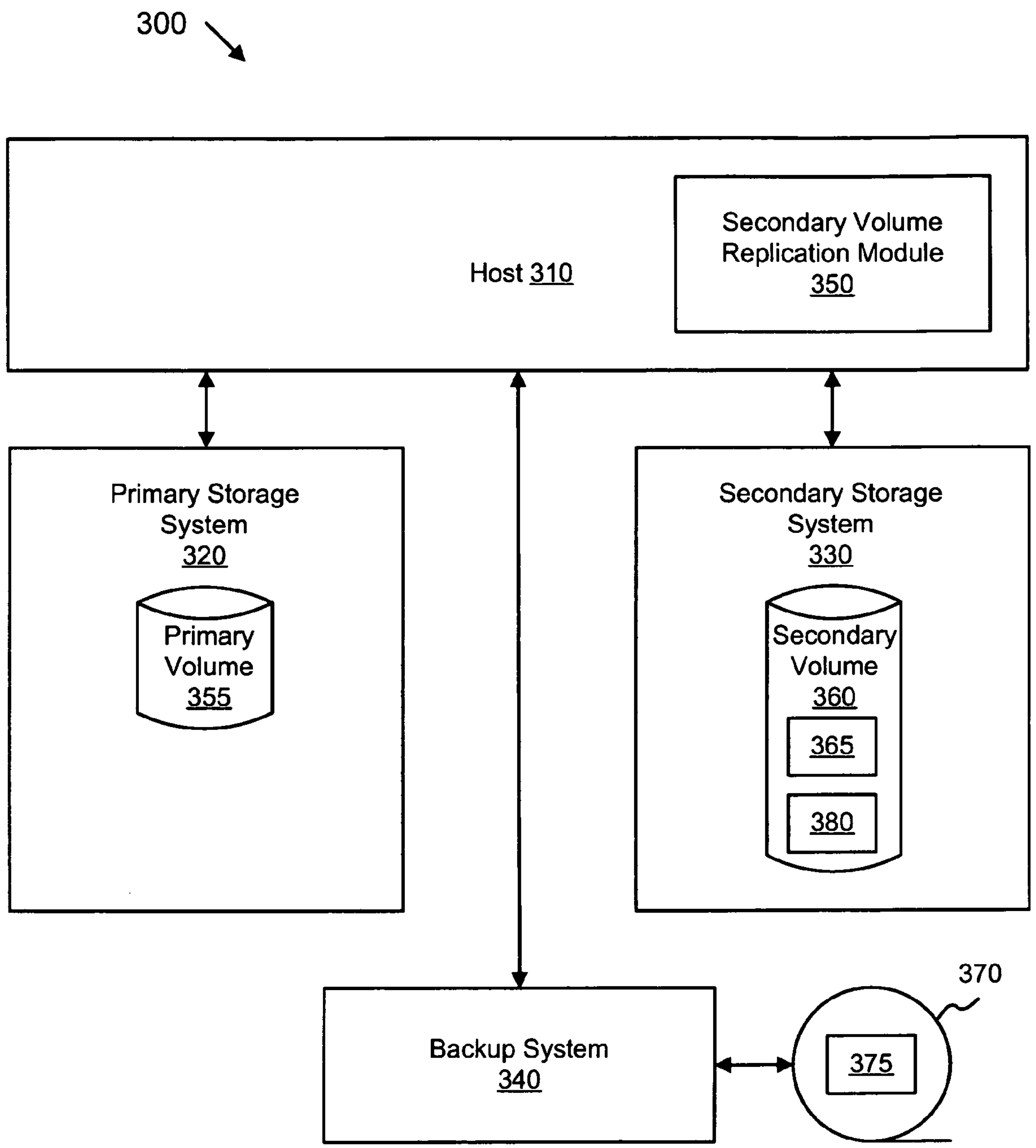
FIG. 3 is a schematic block diagram illustrating one embodiment of a mirrored volume replication system of the present invention.

FIG. 3 is a schematic block diagram illustrating one embodiment of a mirrored volume replication system of the present invention. The system 300 includes a host 310 operably connected to a primary storage system 320, a secondary storage system 330, and a backup system 340. In the depicted embodiment, a secondary volume replication module 350 resides on the host 310. In some embodiments, the secondary volume replication module 350 may reside on an external storage system. In certain embodiments, the secondary storage system 330 may be directly connected to the primary storage system 320 in order to facilitate remote synchronous mirroring operations.

The primary storage system 320 includes at least one primary volume 355 configured as a mirror pair primary volume, and the secondary storage system 330 includes at least one secondary volume 360 configured as a mirror pair secondary volume. During mirroring operations, the primary volume identifier is identical to the secondary volume identifier.

The secondary volume replication module 350 suspends the mirroring operation between the primary volume 355 and the secondary volume 360, and associates the secondary volume with a unique identifier such that the secondary volume may be brought online without introducing a duplicate volume identifier. In one embodiment, the secondary volume is associated with a unique identifier by overwriting the secondary volume identifier field 365 with the unique identifier. The secondary volume replication module 350 copies the data from the secondary volume 360 to a backup volume 370 and writes the suspend-time secondary volume identifier to a backup volume identifier field 375.

In some embodiments, the secondary volume replication module 350 may write the suspend-time secondary volume identifier to a hidden field 380 on the secondary volume 360 and, after the replication of the secondary volume 360 is complete, copy the contents of the hidden field 380 to the backup volume identifier field 375. In some embodiments, the secondary volume replication module 350 resynchronizes the secondary volume 360 to the primary volume 355 and reestablishes the mirroring operations between the primary volume 355 and the secondary volume 360.

Figure 4:
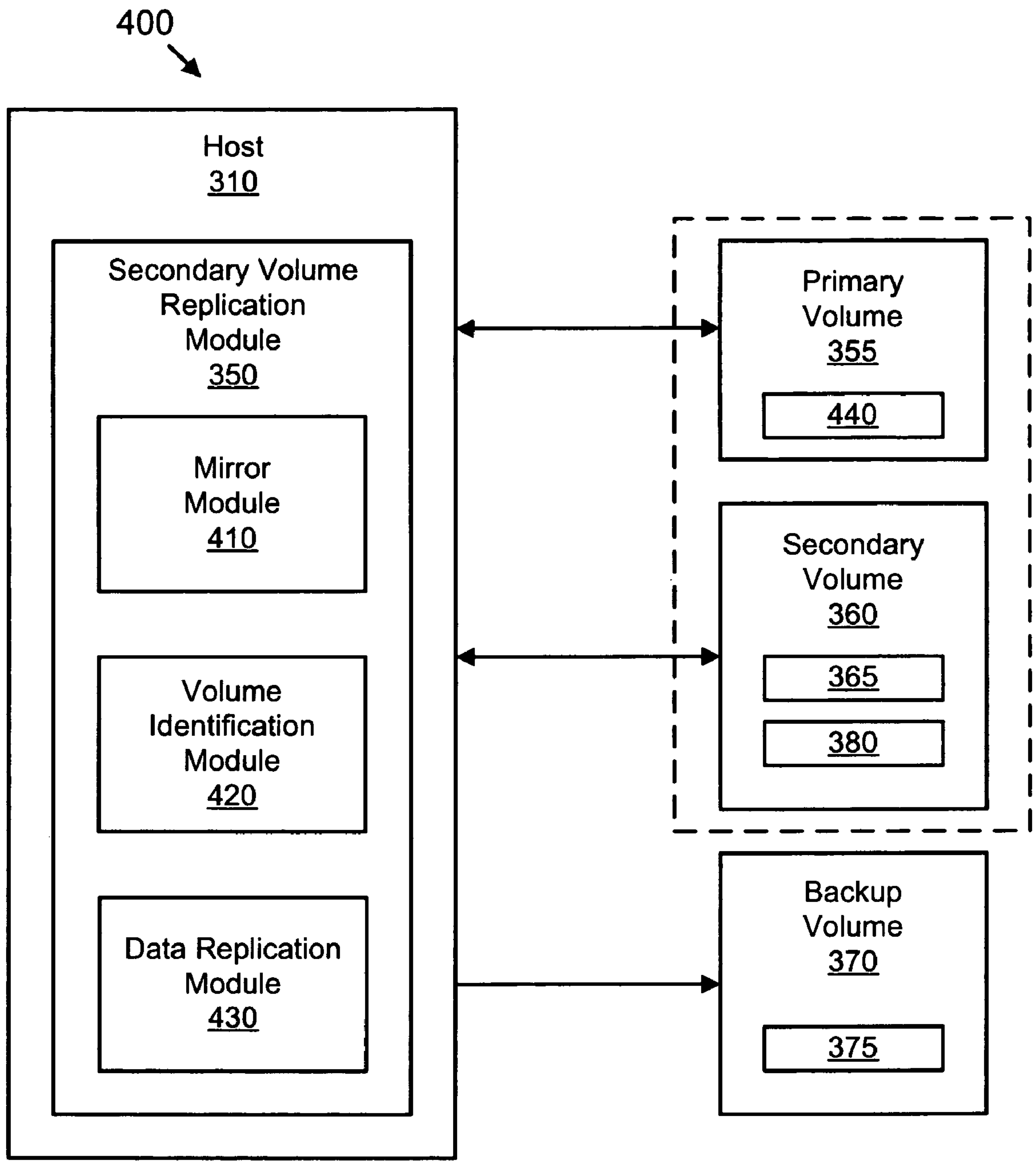
FIG. 4 is a schematic block diagram illustrating one embodiment of a mirrored volume replication apparatus of the present invention.

FIG. 4 is a schematic block diagram illustrating one embodiment of a mirrored volume replication apparatus 400 of the present invention. A host 310 is operably connected to a primary storage volume 355 and a secondary volume 360 configured as a mirror pair, and a backup volume. The depicted host 310 includes a secondary volume replication module 350. The depicted secondary volume replication module 350 includes a mirror module 410, a volume identification module 420, and a data replication module 430. In some embodiments the secondary volume replication module 350 may reside on an external storage system.

The secondary volume 360 contains a volume identifier field 365, and the backup volume 370 contains a volume identifier field 375. The volume identifier field 375 contains a volume identifier associated with the volume on which the field 375 resides. Because the primary volume 355 and the secondary volume 360 operate as a mirror pair, the secondary volume identifier is identical to the primary volume identifier. The value in the secondary volume identifier field 365 at the time the mirror operations are suspended is referred to as the suspend-time secondary volume identifier.

The mirror module 410 under certain circumstances suspends the mirror operations between the primary volume 355 and the secondary volume 360. In some embodiments, the mirror module 410 also initiates resynchronization of the secondary volume 360 to the primary volume 355 and reestablishes the mirroring operations between the primary volume 355 and the secondary volume 360. During a resynchronization operation, the secondary volume identifier field 365 may be overwritten by the primary volume identifier field 440.

The volume identification module 420 associates the secondary volume with a unique volume identifier, such that the renamed secondary volume 360 may be brought online without introducing a duplicate volume identifier. The volume identification module 420 writes the suspend-time secondary volume identifier to the backup volume identifier field 375. In some embodiments, the volume identification module 420 writes the suspend-time secondary volume identifier to a hidden field 380 on the secondary volume 360 and, subsequent to the replication, copies the contents of the hidden field 380 to the backup volume identifier field 375. Consequently, if the replication operation is interrupted, the volume identification module 420 may recover the suspend-time secondary volume identifier from the hidden field 380 on the secondary volume 360 in order to write the backup volume identifier field 375.

The data replication module 430 copies the data from the secondary volume 360 to the backup volume 370. In some embodiments, the data replication module 430 may bring the secondary volume 360 online prior to the start of the replication operation and take the secondary volume 360 offline after the replication operation is complete.

Figure 5:
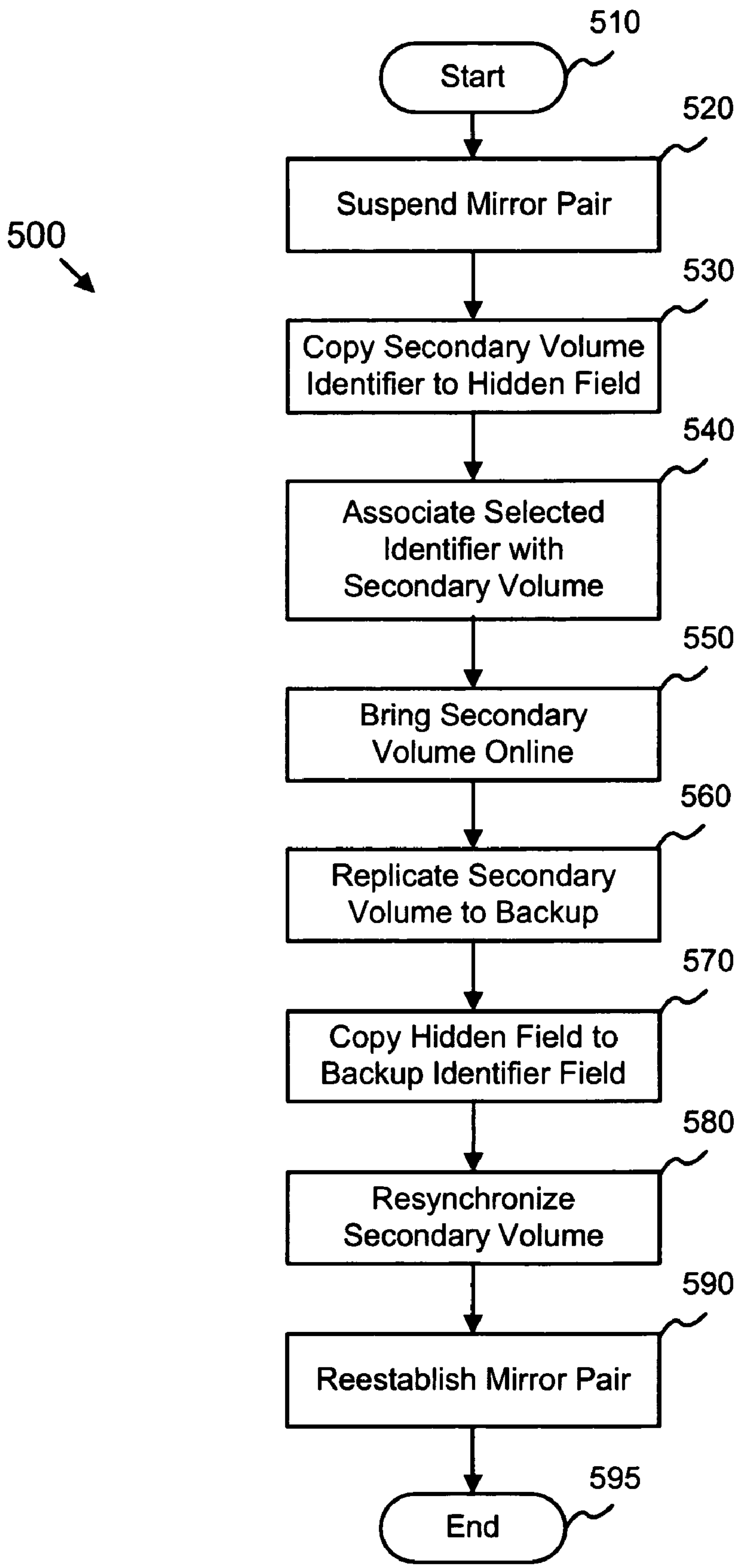
FIG. 5 is a schematic flow chart diagram illustrating one embodiment of a method for replicating a mirrored volume of the present invention.

FIG. 5 is a schematic flow chart diagram illustrating one embodiment of a method 500 for replicating a secondary volume of a mirrored volume pair of the present invention. The method 500 starts 510 when a user requests a point-in-time copy of a mirrored volume. The mirror module 410 suspends 520 the mirroring operations between a primary volume 355 and a secondary volume 360. Then the volume identification module 420 copies 530 the secondary volume identifier to a hidden field 380 on the secondary volume 360, and afterwards associates 540 the secondary volume 360 with a selected identifier such that the secondary volume identifier will not introduce a duplicate volume when the secondary volume 360 is brought online.

Subsequently, the data replication module 430 brings 550 the secondary volume 360 online and then replicates 560 the secondary volume 360 by copying all data resident on the secondary volume 360 to the backup volume 370. The volume identification module 420 copies 570 the contents of the hidden field 380 to the backup volume identifier field 375. Then the mirror module 410 resynchronizes 580 the secondary volume 360 to the primary volume 355 by copying the tracks of the primary volume 355 containing data that differs from the associated secondary volume track data to the secondary volume 360. The mirror module 410 then reestablishes 590 the mirror relationship between the primary volume 355 and the secondary volume 360, and the method 500 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for replicating a secondary volume of a mirrored volume pair, the apparatus comprising:

a software mirror module operating on a processor and configured to suspend mirroring operations between a primary volume and a secondary volume, each volume comprising a suspend-time volume identifier within a volume identifier field;

a volume identification module configured to copy the suspend-time secondary volume identifier for the secondary volume to a hidden field on the secondary volume and associate the secondary volume with a selected volume identifier;

a data replication module configured to copy a volume to a backup volume;

and the volume identification module further configured to associate the suspend-time secondary volume identifier with a backup volume.

2. The apparatus of claim 1, wherein the volume identification module is configured to copy the hidden field to the backup volume identifier field.

3. The apparatus of claim 1, wherein the data replication module is further configured to bring the secondary volume online.

4. The apparatus of claim 1, wherein the mirror module is further configured to reestablish mirroring operations between the primary volume and the secondary volume.

5. The apparatus of claim 1, wherein the mirror module is further configured to resynchronize the secondary volume with the primary volume.

6. The apparatus of claim 1, wherein the selected volume identifier is a unique volume identifier.

7. A system for replicating a secondary volume of a mirrored volume pair, the system comprising:

a host configured to read and write data;

a primary storage system in communication with the host, the primary storage system having a primary volume;

a secondary storage system configured to mirror data on the primary storage system using a secondary volume, the secondary volume having a suspend-time volume identifier within a volume identifier field;

a backup system configured to replicate an online volume to a backup volume;

a secondary volume replication module configured to suspend a mirroring operation, save the suspend-time secondary volume identifier for the secondary volume to a hidden field on the secondary volume, associate the secondary volume with a selected identifier, copy the secondary volume to the backup volume, and associate the suspend-time secondary volume identifier with the backup volume.

8. The system of claim 7, wherein the secondary volume replication module is further configured to copy the hidden field to the backup volume identifier field.

9. The system of claim 7, wherein the secondary volume replication module is further configured to bring the secondary volume online.

10. The system of claim 7, wherein the secondary volume replication module is further configured to reestablish mirroring operations between the primary volume and the secondary volume.

11. The system of claim 7, wherein the secondary volume replication module is further configured to resynchronize the secondary volume with the primary volume.

12. A computer readable storage medium comprising computer readable code configured to carry out a method for replicating a secondary volume of a mirrored volume pair, the method comprising:

suspending mirroring operations between a primary volume and a secondary volume, each volume comprising a suspend-time volume identifier within a volume identifier field;

copying the suspend-time secondary volume identifier for the secondary volume to a hidden field on the secondary volume;

associating the secondary volume with a selected volume identifier;

replicating the secondary volume to a backup volume; and associating the suspend-time secondary volume identifier with the backup volume.

13. The computer readable storage medium of claim 12, wherein associating the suspend-time secondary volume identifier with the backup volume comprises copying the hidden field contents to a backup volume identifier field.

14. The computer readable storage medium of claim 12, further comprising bringing the secondary volume online.

15. The computer readable storage medium of claim 12, further comprising reestablishing mirroring operations between the primary volume and the secondary volume.

16. The computer readable storage medium of claim 15, wherein reestablishing mirroring operations further comprises resynchronizing the secondary volume with the primary volume.

17. The computer readable storage medium of claim 15, wherein the operations of suspending mirroring operations, associating the secondary volume with a selected identifier, bringing the secondary volume online, replicating the secondary volume to a backup volume, associating the suspend-time secondary volume identifier with the backup volume, and reestablishing mirroring operations between the primary volume and the secondary volume are performed as an automated sequence responsive to a single input stimuli.

18. The computer readable storage medium of claim 12, wherein associating the secondary volume with a selected volume identifier comprises overwriting the secondary volume identifier field with the selected volume identifier.

19. A method for replicating a secondary volume of a mirrored volume pair, the method comprising:

suspending mirroring operations between a primary volume and a secondary volume, each volume comprising a suspend-time volume identifier within a volume identifier field;

copying the suspend-time secondary volume identifier for the secondary volume to a hidden field on the secondary volume;

associating the secondary volume with a selected volume identifier;

replicating the secondary volume to a backup volume; and associating the suspend-time secondary volume identifier with the backup volume.

20. The method of claim 19, wherein associating the suspend-time secondary volume identifier with the backup volume comprises copying the hidden field contents to the backup volume identifier field.

21. The method of claim 19, further comprising bringing the secondary volume online.

22. The method of claim 19, further comprising reestablishing mirroring operations between the primary volume and the secondary volume.

23. The method of claim 22, wherein reestablishing mirroring operations further comprises resynchronizing the secondary volume with the primary volume.

24. The method of claim 22, wherein the operations of suspending mirroring operations, associating the secondary volume with a selected identifier, bringing the secondary volume online, replicating the secondary volume to a backup volume, associating the suspend-time secondary volume identifier to the backup volume, and reestablishing mirroring operations between the primary volume and the secondary volume are performed as an automated sequence responsive to a single input stimuli.

25. The method of claim 19, wherein the selected volume identifier is a unique volume identifier.

26. An apparatus for replicating a secondary volume of a mirrored volume pair, the apparatus comprising:

means for suspending mirroring operations between a primary volume and a secondary volume, each volume comprising a suspend-time volume identifier within a volume identifier field;

means for copying the suspend-time secondary volume identifier for the secondary volume to a hidden field on the secondary volume;

means for associating the secondary volume with a selected volume identifier;

means for replicating the secondary volume to a backup volume; and means for associating the suspend-time secondary volume identifier with the backup volume.

* * * * *